(12) United States Patent
Arenson et al.

(10) Patent No.: US 9,532,563 B2
(45) Date of Patent: Jan. 3, 2017

(54) SPRAYING APPARATUS WITH SPRAY NOZZLE FLOW SENSING AND MONITORING SYSTEM

(75) Inventors: Marc A. Arenson, Bartlett, IL (US); Joe Davenport, New Berlin, IL (US); Steven G. Stone, Virden, IL (US)

(73) Assignee: Spraying Systems Co., Wheaton, IL (US)

( * ) Notice: Subject to any disclaimer, the term of this patent is extended or adjusted under 35 U.S.C. 154(b) by 446 days.

(21) Appl. No.: 13/566,774

(22) Filed: Aug. 3, 2012

(65) Prior Publication Data
US 2013/0037625 A1 Feb. 14, 2013

Related U.S. Application Data

(60) Provisional application No. 61/523,265, filed on Aug. 12, 2011.

(51) Int. Cl.
*B67D 7/08* (2010.01)
*A01M 7/00* (2006.01)

(52) U.S. Cl.
CPC ................................ *A01M 7/0089* (2013.01)

(58) Field of Classification Search
CPC ............................. B67D 7/08; A01M 7/0089
USPC ........ 239/71, 68, 74, 171, 155, 156; 222/23, 222/30, 52
See application file for complete search history.

(56) References Cited

U.S. PATENT DOCUMENTS

| | | | |
|---|---|---|---|
| 4,315,317 A | | 2/1982 | Orchard et al. |
| 4,553,702 A | | 11/1985 | Coffee et al. |
| 4,630,773 A | * | 12/1986 | Ortlip ................................ 239/1 |
| 5,134,961 A | * | 8/1992 | Giles et al. .................... 118/684 |
| 5,334,987 A | * | 8/1994 | Teach ................................. 701/3 |
| 5,348,226 A | * | 9/1994 | Heiniger et al. ................... 239/1 |
| 5,704,546 A | | 1/1998 | Henderson et al. |
| 6,749,134 B2 | | 6/2004 | Arenson et al. |
| 2002/0029804 A1 | * | 3/2002 | Liorati et al. ................. 137/486 |
| 2002/0190140 A1 | * | 12/2002 | Arenson et al. .............. 239/391 |
| 2005/0098485 A1 | * | 5/2005 | Boyd et al. ..................... 210/87 |
| 2012/0168530 A1 | | 7/2012 | Ellingson et al. |

OTHER PUBLICATIONS

U.S. Patent & Trademark Office, International Search Report in International Patent Application No. PCT/US2012/049566 (Oct. 10, 2012).
U.S. Patent & Trademark Office, Written Opinion of the International Search Authority in International Patent Application No. PCT/US2012/049566 (Oct. 10, 2012).

* cited by examiner

*Primary Examiner* — Arthur O Hall
*Assistant Examiner* — Chee-Chong Lee
(74) *Attorney, Agent, or Firm* — Leydig, Voit & Mayer, Ltd.

(57) ABSTRACT

A liquid spray boom having a plurality of spray nozzles and a flow monitoring system for monitoring the liquid flow to each of the spray nozzles. The spray nozzles each have a respective flow metering passage through which liquid to the nozzle passes a magnetic turbine in the metering passage rotatable as an incident to and in relation to liquid directed through the flow metering passage for generating changing magnetic fields, a hall effect sensor associated with each magnetic turbine for sensing the changing magnetic fields, and a control module for receiving signals from the sensor for monitoring the liquid flow to each spray nozzle and providing an alert indication in the event that the flow fails to meet predetermined requirements.

16 Claims, 13 Drawing Sheets

SPRAYING APPARATUS WITH SPRAY NOZZLE FLOW SENSING AND MONITORING SYSTEM

CROSS-REFERENCE TO RELATED APPLICATIONS

This patent application claims the benefit of U.S. Provisional Patent Application No. 61/523,265, filed Aug. 12, 2011, which is incorporated by reference.

FIELD OF INVENTION

The present application relates generally to liquid spraying apparatus, and more particularly, to a spraying apparatus having an improved system for sensing and monitoring liquid flow and/or faulty operation of the spray nozzles of the spraying apparatus.

BACKGROUND OF THE INVENTION

Spray booms for agricultural usage provide a great convenience to farmers and others seeking to spray liquid chemicals in agricultural operations. Such spray booms typically have large numbers of laterally-spaced spray nozzles each of which discharge an atomized liquid spray onto the agricultural crop. Over time, the operation and performance of the nozzles of the spray apparatus can become faulty, through partial or complete blockage of flow passages, wear of the nozzle parts, or damage, resulting in uneven or ineffective application of the chemical. In addition, the operator may be unaware of the faulty spray performance at the time of application and have difficulty in going back to spot treat problem areas if the fault is later discovered. Re-application of the chemical, of course, is time-consuming and costly. In addition, damage to the spray nozzles could result in excessive application of the chemical, causing complete destruction of the crop. Moreover, in modern farm operation, it sometimes is critical that the proper amount of chemical is sprayed at the time of application. Chemical sterilization of corn to provide de-tasseled rows requires certainty that the proper application is applied at the time of spraying. Improper or misapplication can damage surrounding areas of the crop as well.

Hence, there is a great need for a system for reliably monitoring spray performance and alerting the operator of faulty operation of spray nozzles of a spraying apparatus in real time. While different technologies have attempted to determine when a spray tip is plugged or worn, these systems have not been reliable in meeting the needs of operators seeking to monitor clogging or malfunction of selected spray nozzles of a spray boom sufficient to minimize the necessity for large-scale reapplication of chemicals or damage to crops.

OBJECTS AND SUMMARY OF THE INVENTION

It is an object of the present invention to provide a spraying apparatus having an improved system for monitoring the flow of the individual nozzles and sensing malfunctions.

Another object is to provide a spraying apparatus as characterized above which is effective for measuring the flow through the individual nozzle of the apparatus and detecting when one flow rate changes with respect to the others.

A further object is to provide a spray apparatus of the above kind in which the flow monitor system is adapted to identify individual nozzles that are faulty in operation.

Still a further object is to provide a spraying apparatus of the foregoing type in which the flow monitoring system measures and monitors the individual flow rates of the nozzles of the spraying apparatus.

Another object is to provide such a spray apparatus in which the spray nozzle monitoring system is operative for identifying specific areas in the field that are sprayed during faulty operation of a spray nozzle or nozzles of the spraying apparatus. A related object is to provide such a spray apparatus in which the monitoring system identifies specific areas in the field in which chemical was improperly applied or missed for later reference.

Yet another option is to provide a spraying apparatus having a flow monitoring system of the foregoing type which is relatively simple in construction and lends itself to economical manufacture and easy usage.

Other objects and advantages of the invention will become apparent upon reading the following detailed description and upon reference to the drawings.

BRIEF DESCRIPTION OF THE DRAWING(S)

Figure 1:
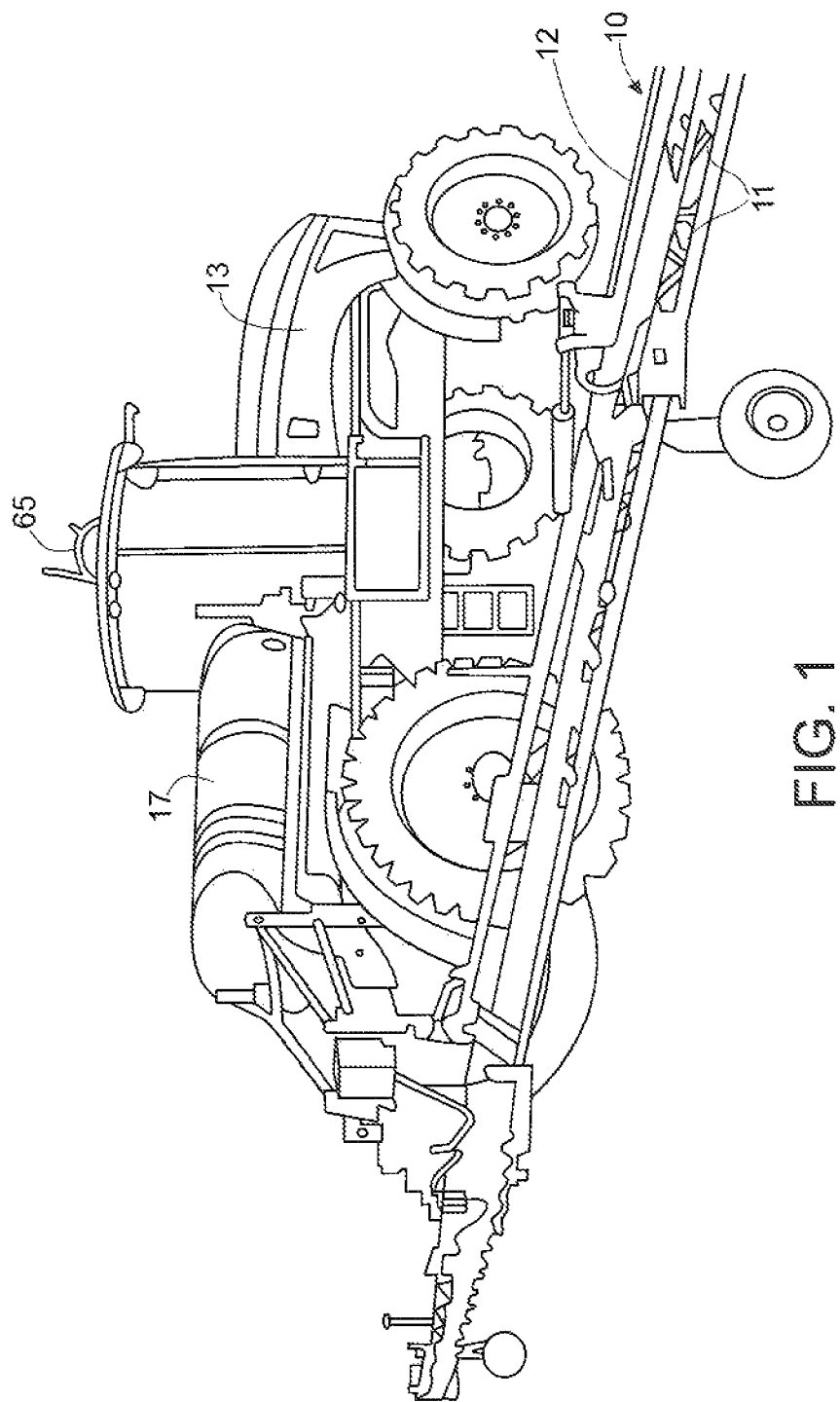
FIG. 1 is a perspective of an illustrative spray boom in accordance with the invention being pulled by a motorized tractor.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DESCRIPTION OF THE PREFERRED EMBODIMENTS

Figure 1A:
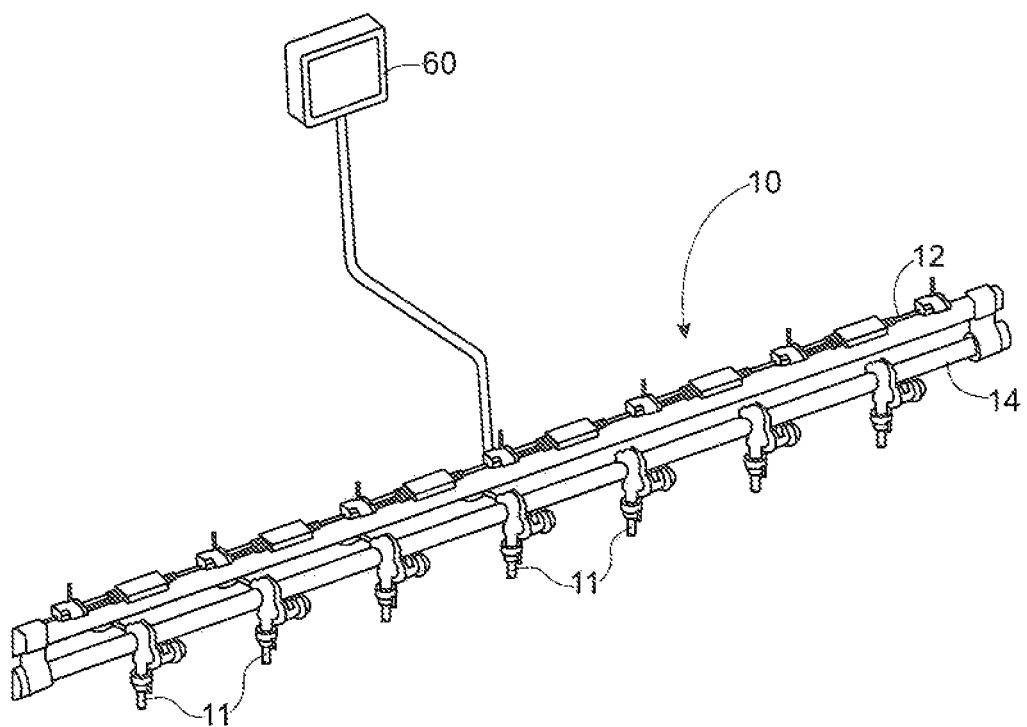
FIG. 1A is an enlarged perspective of a section of the spray boom shown in FIG. 1.
Figure 2:
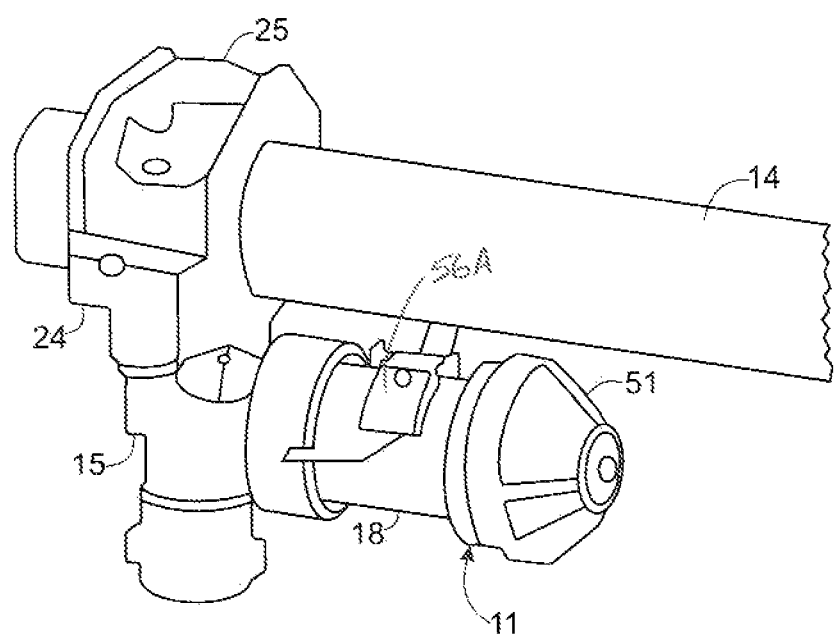
FIG. 2 is an enlarged fragmentary perspective of one of the spray nozzle assemblies and its mounting on the illustrated spray boom.

Referring now more particularly to FIGS. 1 and 1A of the drawings, there is shown an illustrative spray boom 10 having a plurality of liquid spray nozzle assemblies 11 for spraying chemicals or other liquids onto a field along strips corresponding to the width of the spray boom 10 as it is being pulled by a tractor 13 or the like. The spray boom 10 in this case includes a laterally extending support member 12 which carries a liquid supply conduit 14 which may be coupled to a liquid supply tank 17 carried the tractor 13.

Figure 3:
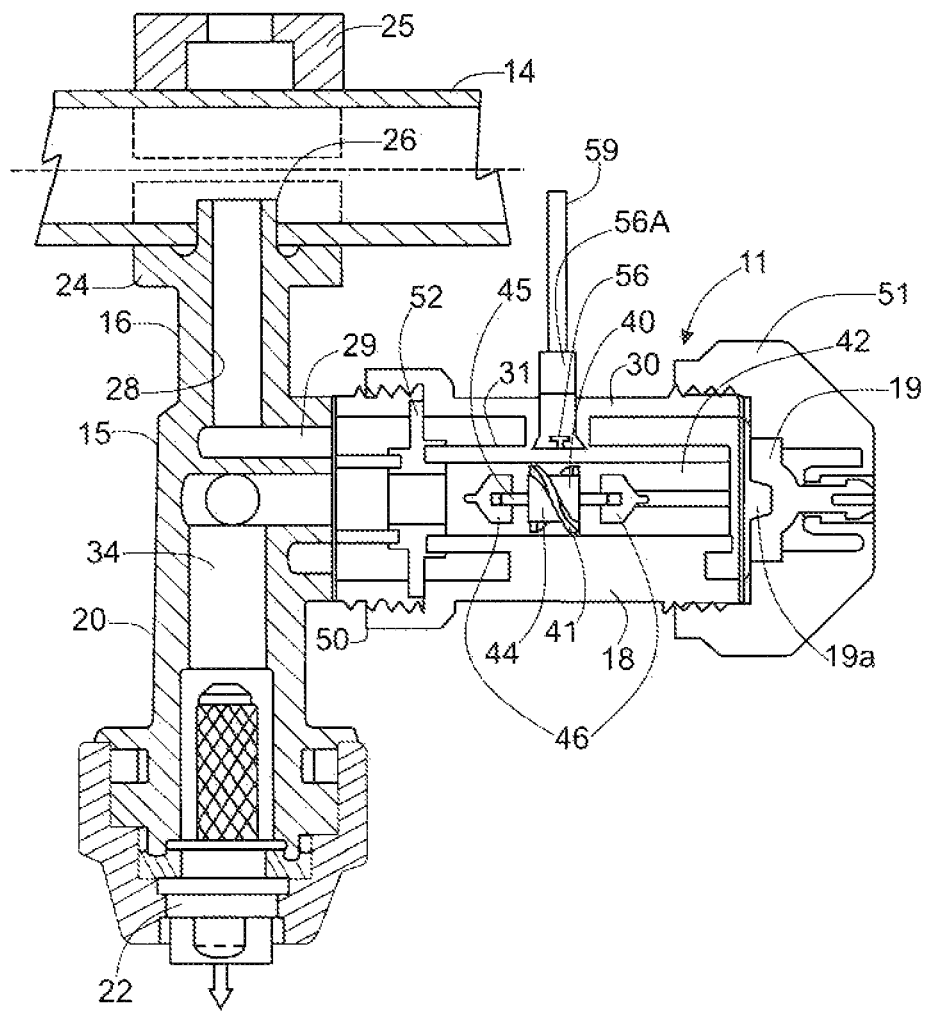
FIG. 3 is an enlarged vertical section of one of the illustrated spray nozzle assemblies.
Figure 4:
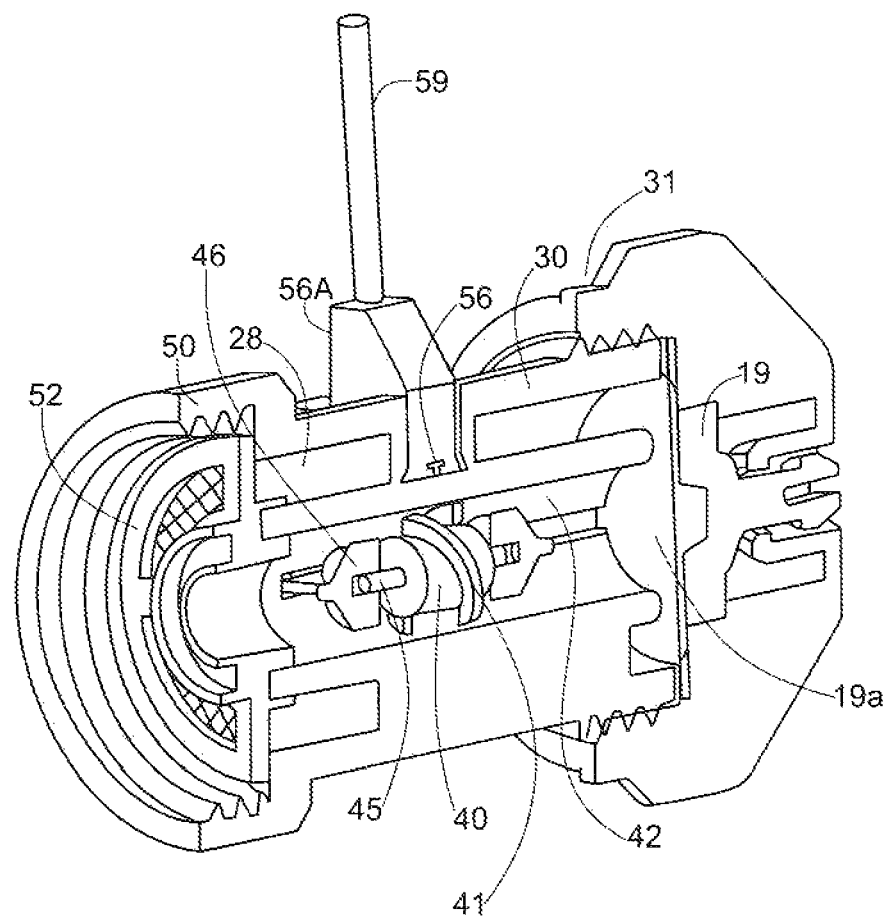
FIG. 4 is an enlarged vertical section, in perspective, of a check valve supporting huh section of the spray nozzle assembly show in FIG. 3.

The spray nozzle assemblies 11 each are supported in depending fashion for the liquid supply conduit 14 in a conventional manner. To this end, illustrated liquid spray nozzle assemblies 11, as best depicted in FIGS. 3 and 4, each include a nozzle support body 15 which comprises a mounting and liquid inlet section 16, a generally cylindrical check valve supporting hub section 18 extending laterally from the mounting and inlet section 16 in parallel relation to the liquid supply conduit 14 upon which a conventional check valve 19 is mounted, and a liquid outlet section 20 which carries a spray nozzle 22 disposed below the check valve hub section 18 in aligned relation to the mounting and inlet section 16. While the spray nozzles 22 may be of a conventional quick disconnect type, such as shown U.S. Pat. No. 6,749,134, assigned to same assignee as the present application, the disclosure of which is incorporated herein by reference, it will be understood that other types of spray nozzles could be used.

For securing the spray nozzle assembly 11 to the supply conduit 14, the nozzle support body inlet and mounting section 16 includes an integrally formed cradle-shaped mounting flange 24 positioned adjacent underside of the liquid supply conduit 14 and a clamping element 25 pivotally connected to one end of the mounting flange 24 and positionable over the liquid supply conduit 14 for securement to an opposite end of the mounting flange 24.

Figure 5:
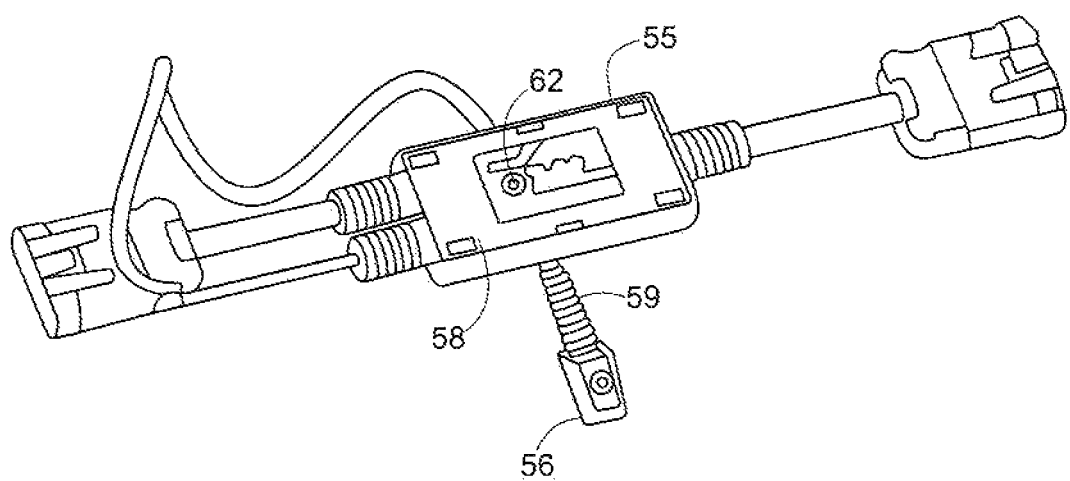
FIG. 5 is a perspective of a sensor interface module of one of the illustrated spray nozzle assemblies.
Figure 6:
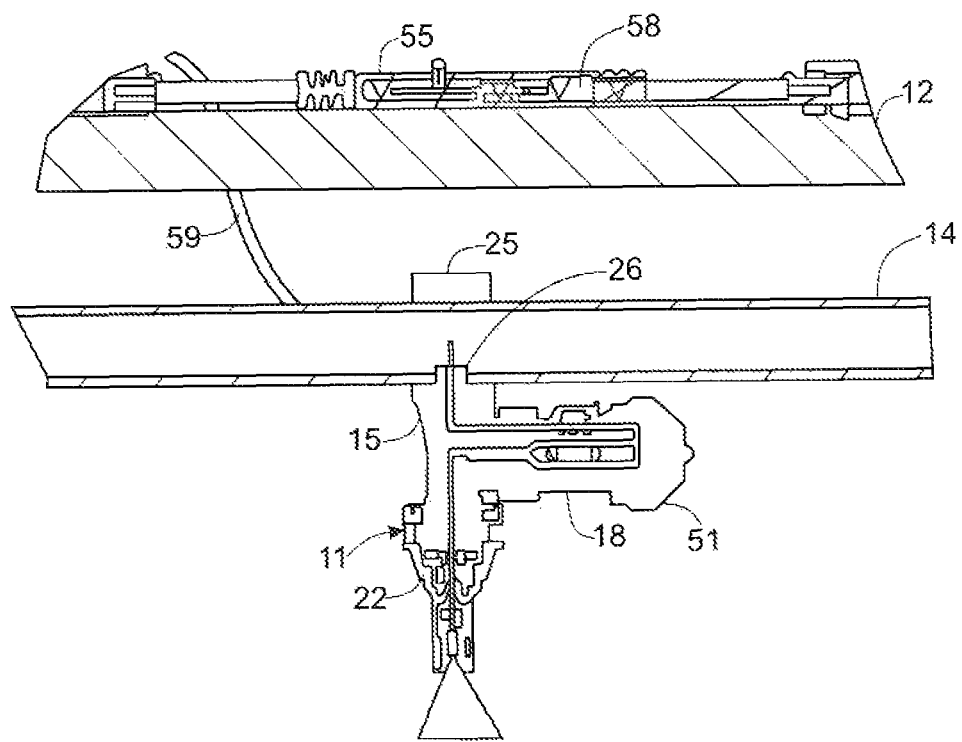
FIG. 6 is a longitudinal section of one of the illustrated spray nozzle assemblies and its associated sensor interface modules.

The mounting and inlet section 16 of the nozzle support body 15 includes a nipple 26 which extends into the liquid supply conduit 14 through an aperture in the underside. Pressurized liquid from the supply tank 17 or other appropriate liquid source supplied to the liquid conduit 14 enters the nipple 26 and passes downwardly through an inlet passage 28 in the mounting and inlet section 16, which in turn communicates with an annular chamber or passage 29 defined between an outer cylindrical wall 30 of the check valve hub section 18 and an internal tube 31 is fixedly supported within the hub section 18 at an end opposite the check valve 19 such that liquid travels in one direction through the annular chamber 29 for communication into an open end of the tube 31 for travel in an opposite direction, as shown in FIG. 5. Liquid in the tube 31 communicates 90 degrees into a central flow passage 34 of the outlet section 20 of the nozzle support body 15 for direction to the spray nozzle 22. As will be understood by a person skilled in the art, pressurized liquid passing through the annular passage 29 will overcome the force of a spring-biased check valve diaphragm 19 of the check valve 19 for enabling the liquid flow from the annular chamber 29 through the tube 31 and to the spray nozzle 22 for discharge from the spray boom 10. When the supply of pressurized liquid to the spray nozzle 22 is cut off, the spring-actuated check valve 19 immediately closes the tube 31 to prevent dripping from the spray nozzle 22.

In accordance with the illustrated embodiment, a spray nozzle liquid flow monitoring system is provided for monitoring liquid flow through the spray nozzle assemblies and detecting whether one or more of the spray nozzles of the spray boom is operating improperly, such as through partial or complete clogging, wear, or damage. In the illustrated embodiment, each spray nozzle assembly 11 has a turbine 40 disposed within a liquid flow passage and arranged to rotate when the liquid flow passes over the turbine 40 as the liquid flow passes through the spray nozzle. The turbine 40, which may alternatively be embodied as a propeller or other flow-activated device, has a magnetic polarity so as to provide varying magnetic fields usable in determining its speed of rotation as it rotates under the action of the passing liquid flow. The turbine 40 in this case is supported within a metering flow passage 42 defined by the tube 31 and has a central cylindrical hub 44 with a radially projecting helical vane 41 extending from the cylindrical huh 44 which is an incident to liquid impinging upon the vane 41 imparts rotative spinning movement to the turbine 40. The turbine 40 has outwardly extending shaft segments 45 at opposite ends supported within respective web-configured supports 46 mounted in the metering passage 42 which permit liquid passage about the supports 46. It will be understood by persons skilled in the art that the annular passageway 29 and the metering flow passage 42 within the tube 31 can be appropriately sized for required flow from the liquid through the check valve hub section 18 to the spray nozzle assembly 11. Further, although a helical vane is illustrated, alternative structures such as individual vanes, foils and the like may be used.

Figure 4A:
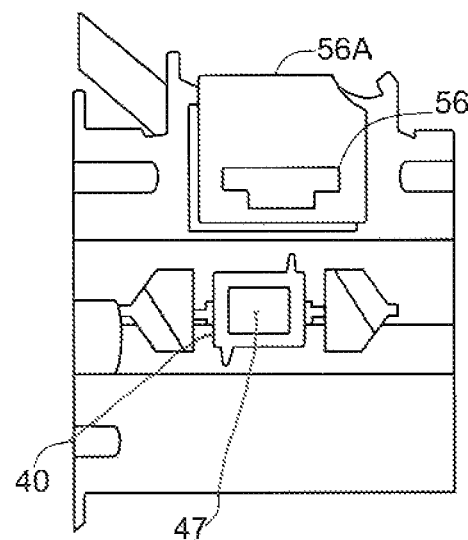
FIG. 4A is an enlarged fragmentary section of a magnetic turbine and associated magnetic field sensor of the illustrated spray nozzle assembly.
Figure 4B:
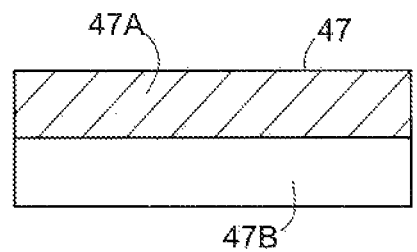
FIG. 4B is a longitudinal section of a magnetic core of the turbine shown in FIG. 4A.
Figure 4C:
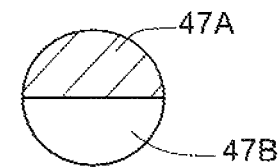
FIG. 4C is an end view of the magnetic core shown in FIG. 4B.

In keeping with this embodiment, the cylindrical hum 44 of the turbine 40 carries a centrally disposed magnet 47, which in this case has a cylindrical configuration and is disposed in parallel relation to the rotary axis of the turbine 40, as depicted in FIG. 4A. One radial half 47A of the cylindrical magnet 47 is polarized (i.e., north) differently from the polarization of the opposite radial half 47B (i.e., south) as depicted in FIGS. 4B and 4C.

To facilitate assembly of the turbine 40 within the check valve huh section 18, as well as removal for cleaning and maintenance, the check valve huh section 18 is removably mountable within the spray nozzle assembly 11. The hub section 18 in this case is coupled to the nozzle support body 15 by a threaded retaining ring 50 and the check valve 19 is housed within a cap 51 threadly fixed to an opposite end of the hub section 18. An annular seal 52 is interposed between axial ends of the check valve hub section 18 and the nozzle support body 15, while permitting fluid flow through and from the check valve hub section 18.

In carrying out the illustrated embodiment, a sensor interface module 55 is provided for sensing the changing magnetic fields that occur as an incident to rotation of the turbine 40 due to the passage of liquid through the flow metering passage 42 of each spray nozzle assembly 11. Each sensor interface module 55 in this case includes a hall-effect sensor 56 which senses the changing magnetic field of the rotating turbine 40. The hall-effect sensor 56 of each spray nozzle assembly is supported in proximate relation to the turbine 40 for sensing the magnetic pole changes and communicating signals indicative of the frequency of these readings to the sensor interface module 55. The signals may be raw signals provided from the sensor 56 or may alternatively be processed values indicating analog or digital values representing the rotational speed or frequency of rotation of the turbine 40. The sensor interface module 55 in this case includes a circuit board 58 mounted on the boom support 12 adjacent to the respective spray nozzle assembly 11 to be monitored and is connected to the hall-effect sensor 56 by a cable 59. The hall-effect sensor 56, which may be of commercially available type, such as from CANFIELD CONNECTOR, Youngstown, Ohio, in this case is encapsulated within a head 56A and mounted with snap action engagement within the hub section 18 in an abutting relation to an outer side of the metering tube 31. Such close proximity of the hall-effect sensor 56 to the turbine 40 enables reliable sensing of magnetic pole changes as an incident to each cycle of rotation of the turbine 40 while remaining outside the metering flow path within the metering tube 31.

In further carrying out the invention, the sensor interface module 55 for each spray nozzle assembly 11 communicates with a monitor or control module 60, preferably located in the cab for easy access and use by an operator, operable for monitoring the rotation of the magnetic turbine 40 of each spray nozzle assembly 11, and hence, the liquid flow of the respective nozzle assembly. The control module 60 may be embodied as a single controller or may include more than one controller disposed to control various functions and/or features of a machine. For example, a master controller, used to control the overall operation and function of the machine, may be cooperatively implemented with a controller that monitors operation of the spray nozzles. In this embodiment, the term "controller" is meant to include one, two, or more controllers that may be associated with the machine or system described and that may cooperate in controlling various functions and operations of the machine or system. The functionality of the controller, while described herein conceptually to include various discrete functions, is illustrative and may be implemented in hardware and/or software without regard to the discrete functionality described. Accordingly, various interfaces of the controller are described relative to components of the spray nozzle assembly 11, but interfaces are not intended to limit the type and number of components that are connected, nor the number of controllers that are described.

Figure 8:
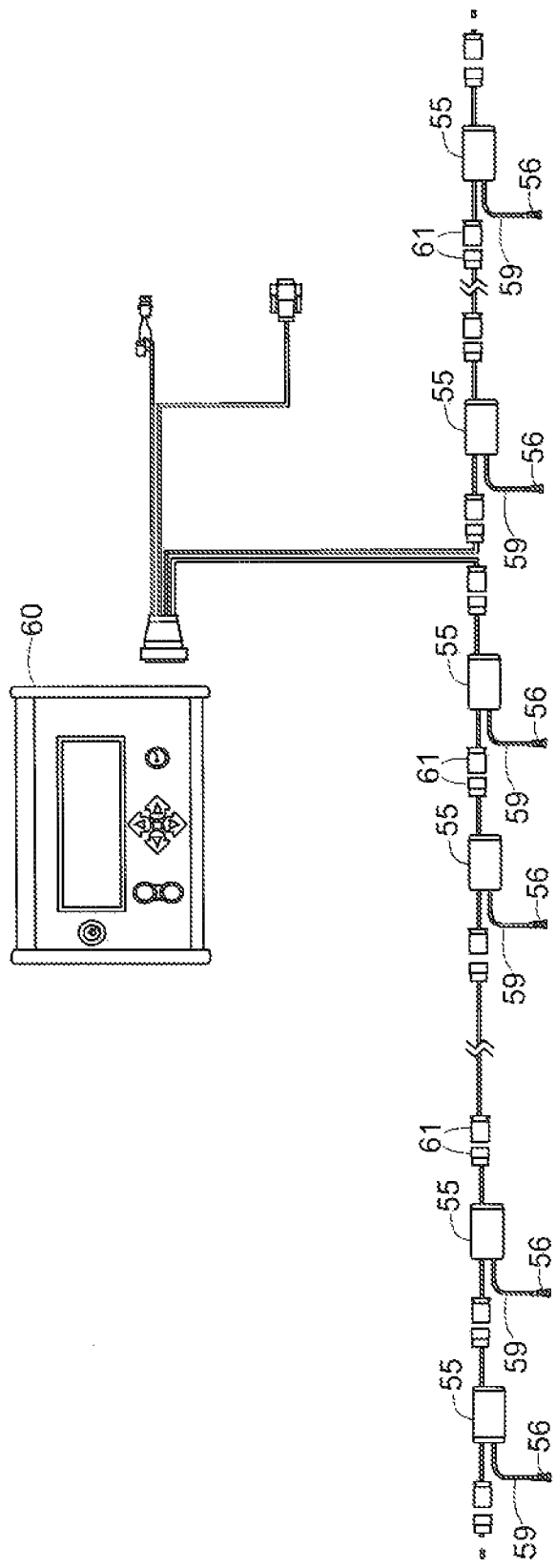
FIG. 8 is a diagrammatic depiction of the arrangement of spray nozzle sensor interface modules for the plurality of spray nozzle assemblies in relation to a central control module of the illustrated system.
Figure 8A:
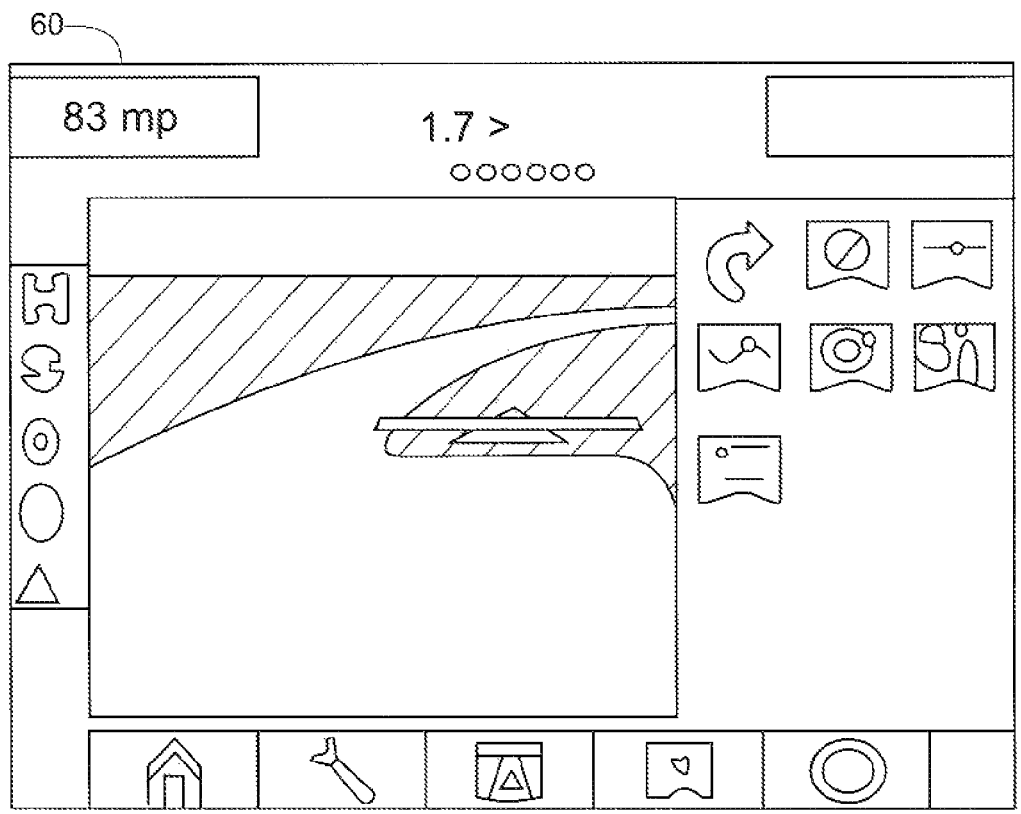
FIG. 8A depicts an alternative embodiment in which liquid flow sensing is carried out in conjunction with GPS mapping system.
Figure 9:
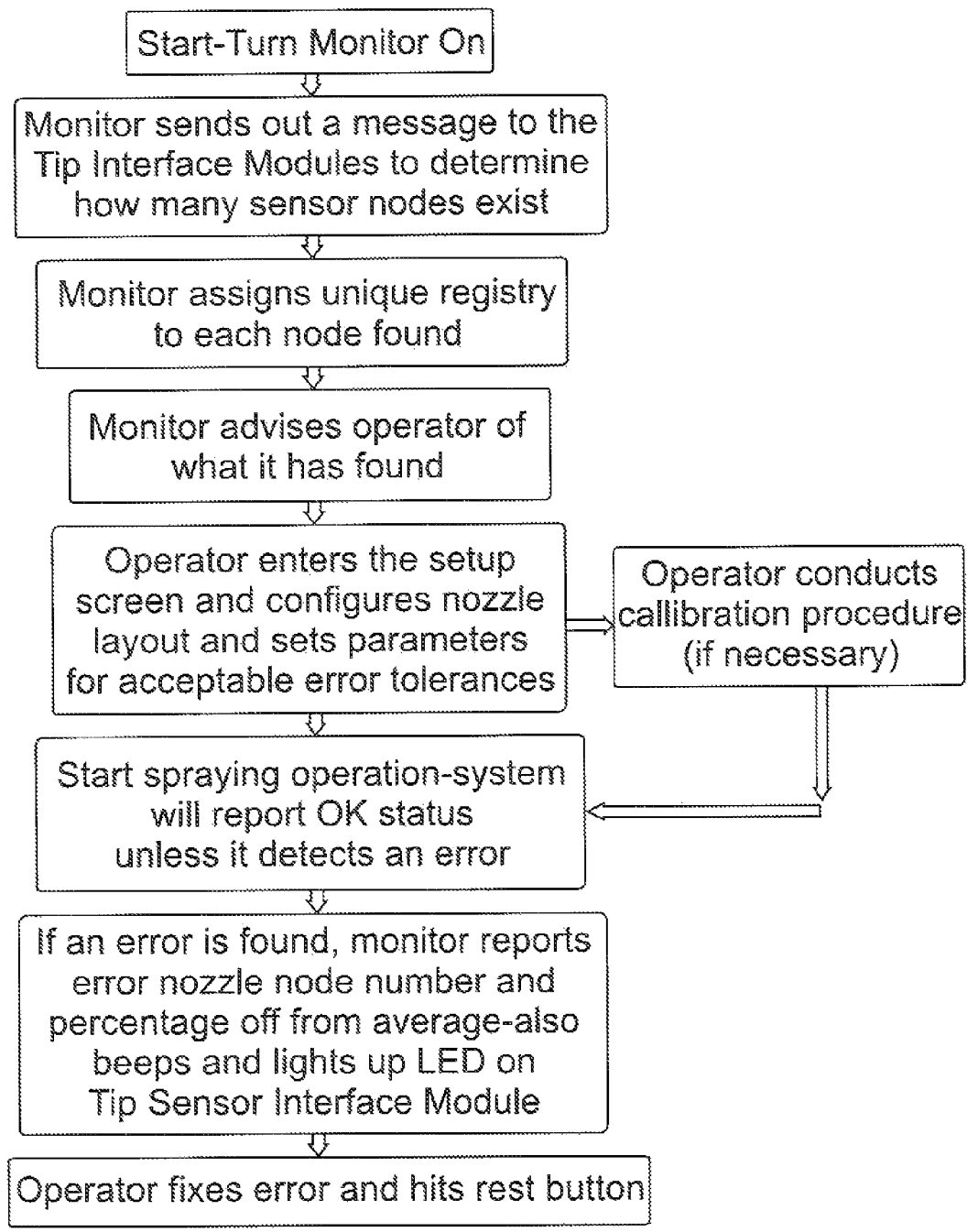
FIG. 9 is a flow chart of an illustrated operation of the liquid flow monitoring system for the plurality of spray nozzle assemblies.

Accordingly, the control module 60 allows the user to control high and low tolerances of rotational speeds and/or flow rates and provide an alert signal when limits are exceeded. For simultaneous monitoring of the plurality spray nozzle assemblies 11 on the boom 10, the sensor interface modules 55 in this case are interconnected by respective connectors 61 at opposite ends which communicate signals to the control module 60 in a closed loop, as depicted in FIG. 8.

In accordance with still a further embodiment, the flow sensing system of the present invention may be utilized with a GPS tracking system for providing mapping of the actual spray discharges from the individual spray nozzles and a record that can be utilized in substantiating the correct chemical application and specific locations or the areas which have been sprayed during malfunctioning of one or more of the spray nozzles. To this end, a GPS receiver 65 may be mounted on the cab, as depicted in FIG. 1, and coupled to the control module 60 for providing instantaneous tracking of the spray discharges from the plurality of spray nozzles with respect to the present location of the machine. In this way, the control module 60 may create a data set of machine positions in a map or within predetermined boundaries, where each position is correlated with an amount of liquid delivered by each nozzle. The data set for each position may further include an indication of whether a particular minimum or maximum fluid deposition limit was exceeded for that position. It will be understood by a person skilled in the art that such record can be valuable in substantiating proper chemical application, as well as identifying the specific areas in the field in which the chemical has been improperly applied, thereby enabling easier and more reliable re-application or spot spraying of those areas.

Figure 7:
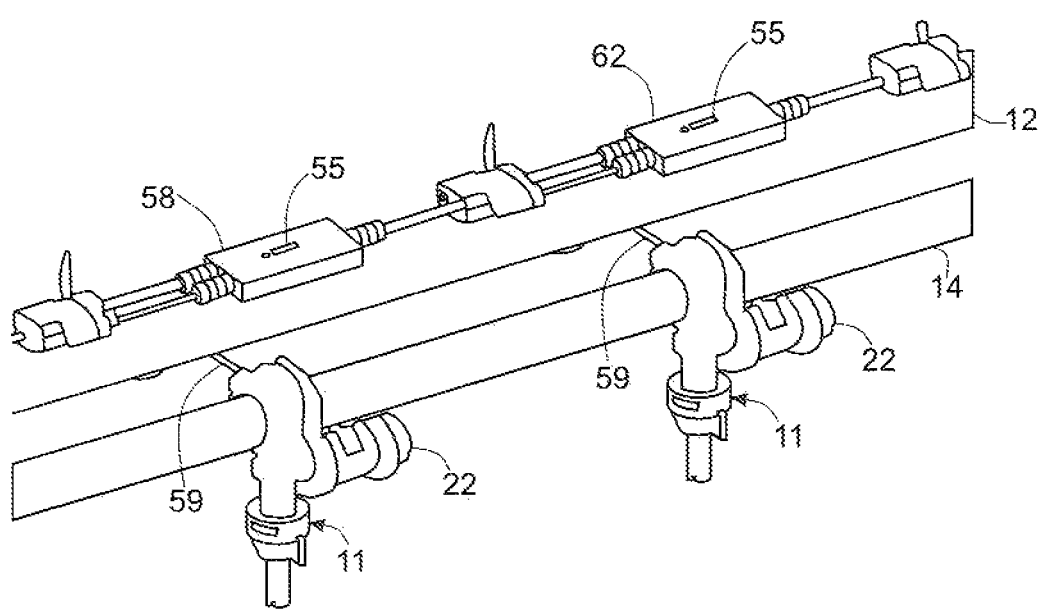
FIG. 7 is a perspective of a plurality of spray nozzle assemblies of the illustrated spray boom and their associated sensor interface modules.
Figure 7A:
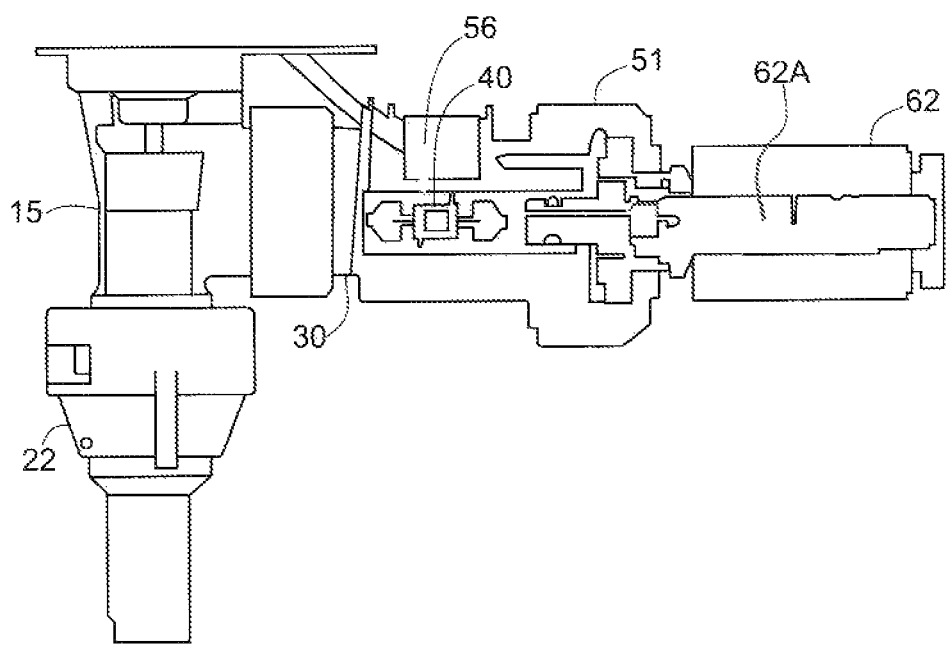
FIG. 7A is a fragmentary section of an alternative embodiment in which each spray nozzle assembly has a solenoid control valve for controlling liquid flow to the spray nozzle assembly.

In carrying out another embodiment, the supply of liquid to each spray nozzle assembly may be individually controlled, through a respective valving arrangement under the control of the control module 60. As depicted in FIG. 7A, each spray nozzle assembly 11 may have a respective liquid supply valve mechanism 62, which in the illustrated embodiment replaces the check valve at the end of the hub section 30. The valve mechanism 62 in this case has a pulse width modulated solenoid valve 62a of a conventional type, which can be selectively operated to vary the flow through the spray nozzle assembly 11 based upon opening and closing rates of the solenoid. The flow monitoring system can be used to measure the flow through each spray nozzle assembly 11 and report back to the control module 60, for simultaneous adjustment of the solenoid operation and flow rate. Alternatively, a stepper motor driven valve could be used for individually controlling the flow rate to each spray nozzle assembly.

Hence, the control module 60 may be programmed to monitor and control various aspects of the performances of the individual spray nozzle assemblies 11, and in the event of a malfunction or other alert signal, energize a LED light 62 on the individual sensor interface module 55 for quickly alerting the operator as to which spray nozzle assembly 11 is sensing an error. More particularly, the control module 60 may be programmed to provide a multiplicity of cumulative and/or alternative functions including:

1. Monitor the frequency output of each spray nozzle assembly magnetic turbine and compare that to each other spray nozzle assembly, or an average of the group, to determine if any of the nozzles are experiencing an incorrect flow rate, and if so, initiate an alert signal and activate the LED light of the respective malfunctioning nozzle or nozzles, as well as generate a fault text message or other error message to the control module 68.
2. Perform calculations based upon the measured frequency of the magnetic turbine of each spray nozzle assembly for conversion into respective flow rates, which can be compared to flow rates of the other nozzles in the system, or a standard to which the flow rate is measured within acceptable parameters.
3. Utilize a GPS receiver with the spraying apparatus transport cab for providing global positioning location data to record and map the actual flow and spray application of the spray nozzles and a record of the spray operation, useful in substantiating the correct amount of chemical sprayed at specific locations, or specific areas that have been sprayed during a spray nozzle malfunction. These areas may then be re-sprayed with the correct amount of chemical by the appropriate spray nozzle assemblies.
4. By means of a respective liquid supply control valve with each spray nozzle assembly, the control module may regulate, in conjunction with data received from the respective magnetic turbine, the prescribed flow rate to individual nozzles for enabling prescription-based spraying in selected areas different from spraying in other areas. Moreover, flow rates from the individual spray nozzles can be independently controlled.

It can be seen that the illustrated spray nozzle liquid flow monitoring system basically comprises 1. A flow meter in the form of a magnetic turbine 40 mounted in flow metering passage 42 which rotates as an incident to liquid flow through the metering passage 42;
2. A sensor interface module 55 which utilizes a hall-effect sensor 56 to measure the rotation of the magnetic turbine 40 of each spray nozzle assembly 11 based upon a changing magnetic field, and
3. A monitor or control module 60 for receiving signals from the sensor interface module 55 and enabling a user to observe the frequency outputs of the individual nozzles and to alert the operator when the spray rate position of any one of the nozzles varies from the operational setting.

In a typical operation of the spray nozzle liquid flow monitoring system, as depicted in FIG. 9, the user will turn on the monitor 60, which will send a signal to all of the tip sensor interface modules 55 to identify them and verify they are communicating properly. The monitor 60 assigns a unique registry to each sensor interface module 55 identified and confirms that information to the operator. The operator may then enter a setup screen and configure the layout of nozzles to be monitored and the parameters for acceptable error tolerances. The operator may then conduct a calibration procedure, if necessary or desired for resetting the nozzle inputs to a beginning value. Upon initiation of spraying, the system will report and okay status unless an error is detected. If an error is subsequently detected during operation of the sprayer, the monitor 60 will report the error nozzle number and error, such as percentage off of average, and energize the LED 62 on the particular sensor interface module 55 adjacent that spray nozzle assembly 11 for easy operator location. The operator may then immediately correct the problem, such as by cleaning a blockage, replacing a nozzle or spray tip, before pressing a reset button to reset the system and remove the alert. If the flow rates of the individual nozzles are within the accepted range or standard, the monitor 66 will display that information. In addition, as indicated above, the control module 60 may keep track of the application rates through calculating flow rates based upon rotation of the turbine 40 and the application of the rates to particular areas in the field utilizing GPS mapping information with the control module 60 initiating a display or alert with respect to missing or under-applied areas due to an error or malfunction situation.

It will be appreciated that the described system allows for the efficient and particularized monitoring of the liquid flow of the plurality of spray nozzles on a spray boom. It will also be appreciated, however, that the foregoing methods and implementations are merely examples of the inventive principles, and that these illustrate only preferred techniques. It is thus contemplated that other implementations of the invention may differ in detail from the foregoing examples. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It will be understood that the use of the terms “a” and “an” and “the” and similar referents in the context of describing the invention (especially in the context of the following claims) are to be construed to cover both the singular and the plural, unless otherwise indicated herein or clearly contradicted by context. The terms “comprising.” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A liquid spraying apparatus comprising a spray nozzle assembly having a nozzle support body forming a liquid inlet section and a liquid outlet section, the liquid outlet section leading fluidly to a nozzle;

a check valve disposed in a check valve supporting hub section connected to the nozzle support body, the check valve selectively fluidly connecting the liquid inlet section with the liquid outlet section;

wherein the check valve supporting hub section has an annular passage communicating with said liquid inlet section and a tube supported within said annular passage defining a return passage communicating between said annular passage and said liquid outlet section when said check valve is in said open position;

a liquid supply for directing liquid to said liquid inlet section of the nozzle, through the check valve, through a flow metering passage disposed downstream of the check valve, and through the liquid outlet section for discharge from the nozzle as a liquid spray;

a liquid flow monitoring system disposed within the flow metering passage and configured for monitoring liquid flow through said flow metering passage;

said monitoring system including a turbine disposed in said flow metering passage and being rotatable as an incident and in relation to liquid flow through said flow metering passage;

said turbine having a magnet for generating changing magnetic fields incident to rotation thereof;

a sensor for sensing the changing magnetic fields generated by rotation of said turbine and producing responsive signals; and a control module communicating with said sensor for monitoring a flow rate through said flow metering passage based upon signals received from said sensor; and a global positioning system (GPS) associated with the control module;

wherein the control module is programmed to:

determine, based on the responsive signals from the sensor, whether the liquid flow through said flow metering passage is correct, and, when the liquid flow through said flow metering passage is incorrect, initiate an alert signal and generate an error message; and create a data set of machine positions, each machine position being correlated with an amount of liquid delivered by each spray nozzle, wherein the machine positions are provided from the GPS to the control module, and wherein the amount of liquid delivered by each nozzle is provided to the control module from the respective sensor;

wherein each of the responsive signals is indicative of a frequency of rotation of the turbine;

wherein the control module is further programmed to determine whether the liquid flow through said flow metering passage is correct by comparing a frequency from one of the responsive signals to a plurality of frequencies from the remaining responsive signals;

wherein the control module is further programmed to calculate an average frequency from the responsive signals, and compare the frequency from each responsive signal with the average frequency to determine whether the liquid flow through each particular spay nozzle that corresponds to the responsive signal is correct.

2. The spraying apparatus of claim 1 in which said sensor includes a hall-effect sensor disposed in spaced relation to said turbine.

3. The spraying apparatus of claim 1 in which turbine includes a central cylindrical hub and a radially extending helical vane effective for imparting rotary movement to said turbine in response to liquid flow through said metering passage.

4. The spraying apparatus of claim 1 in which said magnet has opposite poles radially offset from each other for generating a changing magnetic field as an incident to rotation of the turbine.

5. The spraying apparatus of claim 1 in which said control module is operable for determining the rate of liquid flow through said metering passage based upon signals from said sensor.

6. The spraying apparatus of claim 1 in which said spray nozzle is mounted on a nozzle body, and said metering passage is in said nozzle body.

7. A liquid spraying system comprising:
a plurality of liquid spray nozzle assemblies;
a liquid supply for directing liquid to each of said plurality of liquid spray nozzle assemblies for discharge from each of said plurality of liquid spray nozzle assemblies as a respective liquid spray;
wherein each liquid spray nozzle liquid assembly from the plurality of liquid spray nozzle assemblies includes:
a respective nozzle support body forming a liquid inlet section and a liquid outlet section, the liquid outlet section leading fluidly to a respective nozzle, the liquid inlet section connected to the liquid supply; and
a check valve disposed in a check valve supporting hub section connected to the nozzle support body, the check valve selectively fluidly connecting the liquid inlet section with the liquid outlet section;
wherein the check valve supporting hub section has an annular passage communicating with said liquid inlet section and a tube supported within said annular passage defining a return passage communicating between said annular passage and said liquid outlet section when said check valve is in said open position;
wherein a respective flow metering passage is defined downstream of the check valve and upstream of the nozzle within each respective nozzle support body;
a liquid flow monitoring system for monitoring liquid flow separately to each of said plurality of spray nozzles;
wherein each of the plurality of spray nozzles has a respective magnetic turbine disposed in each respective flow metering passage of each of said plurality of spray nozzles;
said magnetic turbine of each of the plurality of spray nozzles being rotatable as an incident and in relation to liquid directed through each respective flow metering passage for creating changing magnetic fields;
a respective sensor associated with each magnetic turbine for sensing a respective changing magnetic field and generating a respective signal in response thereto, the respective signal having a frequency that is indicative of a frequency of rotation of the magnetic turbine;
a global positioning system (GPS) associated with the control module; and
a control module for receiving a plurality of signals generated from each respective sensor for separately and collectively monitoring the respective liquid flow to each of the plurality of spray nozzles and a total flow provided collectively to the plurality of spray nozzles, wherein the control module is programmed to:
determine, based on the responsive signals from the sensor, whether the liquid flow through said flow metering passage is correct by comparing the frequency from one of the responsive signals to a plurality of frequencies from the remaining responsive signals, and, when the liquid flow through said flow metering passage is incorrect as indicated by a deviation of any one of the frequencies from the remaining frequencies, initiate an alert signal and generate an error message; and
create a data set of machine positions, each machine position being correlated with an amount of liquid delivered by each spray nozzle, wherein the machine positions are provided from the GPS to the control module, and wherein the amount of liquid delivered by each spray nozzle is provided to the control module from the respective sensor;
wherein the control module is further programmed to calculate an average frequency from the responsive signals, and compare the frequency from each responsive signal with the average frequency to determine whether the liquid flow through each particular spay nozzle that corresponds to the responsive signal is correct.

8. The spraying system of claim 7 in which each of said sensors includes a hall-effect sensor disposed in spaced relation to each respective turbine.

9. The spraying system of claim 7 in which said control module is operable for monitoring the flow to each of said plurality of spray nozzles and providing an indication in response to the flow of one of the spray nozzles being different from other of the spray nozzles by a predetermined amount.

10. The spraying system of claim 7 in which said control module is operable for monitoring the flow to each of said plurality of spray nozzles and providing an indication in response to the flow of one of the spray nozzles being different from an average of the other spray nozzles by a predetermined amount.

11. The spraying apparatus of claim 7 in which said control module system is operable for determining the rate of flow of each nozzle individually.

12. The spraying system of claim 7 including a GPS global positioning receiver coupled to said control module, and said control module is operable for recording and mapping the flow rates of the plurality of systems in relation to specific locations being sprayed.

13. The spraying system of claim 12 in which said control module is operable for identifying specific areas in which one or more of the plurality of spray nozzles fails to spray within predetermined limits.

14. The spraying system of claim 7 in which each of said plurality of spray nozzles has a respective individual fluid control valve, and said control module being operative for selectively adjusting the control valves based upon signals received from the sensor of the respective spray nozzle.

15. A liquid spraying apparatus comprising:
a nozzle support body having a liquid inlet section for coupling to a liquid supply, a check valve supporting hub section extending from the inlet section, and a liquid outlet section communicating with said hub section;
a spray nozzle at a downstream end of said outlet section for discharging a liquid spray pattern;
a pressure responsive check valve removably mounted on said hub section for movement between valve open and closed positions;
said hub section having an annular passage communicating with said liquid inlet and a tube supported within said annular passage defining a return passage communicating between said annular passage and said outlet section when said check valve is in said open position;
a turbine disposed in said return passage and being rotatable as an incident and in relation to liquid flow through said return passage for said annular passage to said outlet section;
said turbine having a magnet for generating changing magnetic fields incident to rotation thereof;
a sensor for sensing the changing magnetic fields generated by rotation of said turbine and producing responsive signals, the responsive signals being indicative of a frequency of rotation of the turbine; and
a control module communicating with said sensor for monitoring the flow rate through said return passage based upon signals received from said sensor;
wherein a global positioning system (GPS) associated with the control module;
wherein each of the responsive signals is indicative of a frequency of rotation of the turbine;
wherein the control module is programmed to determine whether the liquid flow through said flow metering passage is correct by comparing a frequency from one of the responsive signals to a plurality of frequencies from the remaining responsive signals, and when the liquid flow through said flow metering passage is incorrect as indicated by a deviation of any one of the frequencies from the remaining frequencies, initiate an alert signal and generate an error message: and
create a data set of machine positions, each machine position being correlated with an amount of liquid delivered by each spray nozzle, wherein the machine positions are provided from the GPS to the control module, and wherein the amount of liquid delivered by each spray nozzle is provided to the control module from the respective sensor;
wherein the control module is further programmed to calculate an average frequency from the responsive signals from a plurality of turbines disposed in a plurality of nozzle support bodies, and to compare the frequency from each of the plurality of responsive signals with the average frequency to determine whether the liquid flow through each particular spay nozzle that corresponds to the responsive signal is correct.

16. The spraying apparatus of claim 15, wherein the hub section and the check valve are removable from the nozzle support body.

* * * * *